US00RE50456E

(19) United States
(12) Reissued Patent
Brewster et al.

(10) Patent Number: US RE50,456 E
(45) **Date of Reissued Patent: *Jun. 10, 2025**

(54) METHOD OF MAKING AN ASPHALT COMPOSITION CONTAINING ESTER BOTTOMS

(71) Applicant: MARATHON PETROLEUM COMPANY LP, Findlay, OH (US)

(72) Inventors: Stormy Brewster, Findlay, OH (US); Stephen J. Jones, Findlay, OH (US); Dennis Keppers, Findlay, OH (US)

(73) Assignee: Marathon Petroleum Company LP, Findlay, OH (US)

( * ) Notice: This patent is subject to a terminal disclaimer.

(21) Appl. No.: 18/101,464

(22) Filed: Jan. 25, 2023

Related U.S. Patent Documents

Reissue of:
(64) Patent No.: 10,323,148
Issued: Jun. 18, 2019
Appl. No.: 15/586,860
Filed: May 4, 2017

U.S. Applications:
(62) Division of application No. 17/345,859, filed on Jun. 11, 2021, now Pat. No. Re. 49,447, which is an application for the reissue of Pat. No. 10,323,148.
(Continued)

(51) Int. Cl.
*C08L 95/00* (2006.01)
*C08K 5/10* (2006.01)
(Continued)

(52) U.S. Cl.
CPC ..... *C08L 95/00* (2013.01); *C08K 5/10* (2013.01); *C11B 13/00* (2013.01);
(Continued)

(58) Field of Classification Search
CPC ..... C08K 5/10; C08L 95/00; C08L 2666/04; C08L 2555/80; C08L 2555/34;
(Continued)

(56) References Cited

U.S. PATENT DOCUMENTS 2,027,404 A 1/1936 Small
2,102,124 A 12/1937 Lithgow
(Continued)

FOREIGN PATENT DOCUMENTS

CA 1262976 11/1989
CN 2871674 2/2007
(Continued)

OTHER PUBLICATIONS

Acromag, Whitepaper: Introduction to the Two-Wire Transmitter and the 4-20MA Current Loop, Nov. 8, 2010, available at http://www.automation.com/pdf-articles/Acromag-Intro-TwoWire-Transmitters-4-20mA-Current-Loop-904A.pdf.
(Continued)

*Primary Examiner* — Ling X Xu
(74) *Attorney, Agent, or Firm* — Ray Quinney & Nebeker PC; Paul N. Taylor

(57) ABSTRACT

This invention involves the addition of ester bottoms to an asphalt paving composition to improve the usable temperature range (UTR). The ester bottoms are a byproduct of refining a feedstock containing all or a portion of vegetable oil or animal fat.

20 Claims, 9 Drawing Sheets

Related U.S. Application Data

(60) Provisional application No. 62/341,700, filed on May 26, 2016.

(51) Int. Cl.
*C11B 13/00* (2006.01)
*C12P 7/64* (2022.01)

(52) U.S. Cl.
CPC ... *C08L 2207/062* (2013.01); *C08L 2207/066* (2013.01); *C08L 2207/14* (2013.01); *C08L 2207/22* (2013.01); *C08L 2555/34* (2013.01); *C08L 2555/60* (2013.01); *C08L 2555/64* (2013.01); *C08L 2555/80* (2013.01); *C08L 2666/04* (2013.01)

(58) Field of Classification Search
CPC ..... C08L 2207/062; C08L 2207/22; C08L 2555/64; C08L 2207/066; C08L 2207/14; C08L 2555/60; C11B 13/00; Y02E 50/10
See application file for complete search history.

(56) References Cited

U.S. PATENT DOCUMENTS 2,290,038 A 7/1942 Folmsbee
2,605,193 A 7/1952 Karll
2,850,436 A 9/1958 Beuther
2,877,129 A 3/1959 Hardman et al.
2,906,635 A 9/1959 Teot
3,047,414 A 7/1962 Katz
3,072,284 A 1/1963 Luhman
3,162,101 A 12/1964 Rostler
3,221,615 A 12/1965 McGovern
3,238,173 A 3/1966 Bailey
3,261,269 A 7/1966 McGovern
3,344,056 A 9/1967 Rostler
3,432,321 A 3/1969 Rostler
3,556,827 A 1/1971 McConnaughay
3,867,111 A 2/1975 Knowles
3,955,416 A 5/1976 Waiwood
3,992,340 A 11/1976 Bonitz
4,064,826 A 12/1977 Pauli
4,073,625 A 2/1978 Kiritani et al.
4,082,823 A 4/1978 Augustine
4,084,915 A 4/1978 Wiseblood
4,112,765 A 9/1978 Hollweck
4,130,474 A 12/1978 Anthony
4,145,322 A 3/1979 Maldonado
4,154,710 A 5/1979 Maldonado
4,162,999 A 7/1979 Bohemen
4,237,052 A 12/1980 Fitoussi
4,242,246 A 12/1980 Maldonado
4,320,788 A 3/1982 Lord
4,323,496 A 4/1982 Mitani
4,330,449 A 5/1982 Maldonado
4,373,961 A 2/1983 Stone
4,392,870 A 7/1983 Chieffo
4,541,735 A 9/1985 Abu-Isa
4,549,834 A 10/1985 Allen
4,554,313 A 11/1985 Hagenbach
4,564,834 A 1/1986 Steele
4,585,816 A 4/1986 Vitkuske
4,647,313 A 3/1987 Clementoni
4,762,565 A 8/1988 Graf
4,789,946 A 12/1988 Sinz
4,971,219 A 11/1990 Dombeck et al.
5,008,653 A 4/1991 Kidd
5,023,282 A 6/1991 Neubert
5,039,342 A 8/1991 Jelling
5,050,603 A 9/1991 Stokes
5,083,870 A 1/1992 Sindelar et al.
5,118,733 A 6/1992 Gelles
5,120,777 A 6/1992 Chaverot
5,177,130 A 1/1993 Beavers
5,180,428 A 1/1993 Koleas
5,234,494 A 8/1993 Sawatzky et al.
5,472,928 A 12/1995 Scheuerman et al.
5,498,327 A 3/1996 Stangeland et al.
5,511,573 A 4/1996 Corte
5,559,166 A 9/1996 Bearden
5,589,057 A 12/1996 Trimble et al.
5,601,697 A 2/1997 Miller
5,660,715 A 8/1997 Trimble et al.
5,681,369 A 10/1997 Osborne
5,766,333 A 6/1998 Lukens
5,816,708 A 10/1998 Urich
5,853,455 A 12/1998 Gibson
5,911,817 A 6/1999 Hayner
5,916,529 A 6/1999 Scheuerman
5,938,130 A 8/1999 Zickell
5,966,311 A 10/1999 Stemporzewski, Jr.
6,001,162 A 12/1999 Hayner
6,015,440 A 1/2000 Noureddini
6,048,447 A 4/2000 Hayner
6,074,128 A 6/2000 Marino
6,083,988 A 7/2000 Becker
6,086,749 A 7/2000 Kramer et al.
6,133,351 A 10/2000 Hayner
6,153,004 A 11/2000 Hayner
6,156,113 A 12/2000 Pasquier
6,174,501 B1 1/2001 Noureddini
6,203,585 B1 3/2001 Majerczak
6,214,103 B1 4/2001 Kitagawa
6,223,789 B1 5/2001 Koch
6,235,104 B1 5/2001 Chattopadhyay
6,249,241 B1 6/2001 Jordan et al.
6,290,152 B1 9/2001 Zickell
6,318,402 B1 11/2001 Ladeira
6,336,479 B1 1/2002 Nanaji
6,348,074 B2 2/2002 Wenzel
6,352,637 B1 3/2002 Doolin et al.
6,380,284 B1 4/2002 Lopez
6,384,112 B1 5/2002 Boussad
6,394,149 B1 5/2002 Parsons
6,414,056 B1 7/2002 Puzic
6,414,066 B1 7/2002 Lem
6,416,249 B1 7/2002 Crupi
6,417,421 B1 7/2002 Yao
6,514,331 B2 2/2003 Varnadoe et al.
6,514,332 B2 2/2003 Varnadoe et al.
6,548,580 B1 4/2003 Rohde
6,575,326 B2 6/2003 Martin, Jr.
6,615,658 B2 9/2003 Snelling
6,659,684 B1 12/2003 Goodhart et al.
6,749,677 B2 6/2004 Freisthler
6,764,542 B1 7/2004 Lackey et al.
6,776,832 B2 8/2004 Spence et al.
6,802,897 B1 10/2004 Lackey
6,852,779 B1 2/2005 Planche
6,927,245 B2 8/2005 Buras et al.
6,932,123 B1 8/2005 Craig
6,935,387 B1 8/2005 Blubaugh
6,948,364 B2 9/2005 Snelling
6,952,996 B2 10/2005 Sisk et al.
6,973,828 B2 12/2005 Zimmermann
7,008,670 B1 3/2006 Freisthler
7,028,382 B2 4/2006 Fisher
7,041,717 B2 5/2006 Margulis
7,047,114 B1 5/2006 Rogers
7,241,821 B1 7/2007 Hayner et al.
7,297,204 B2 11/2007 Crews et al.
7,309,390 B2 12/2007 Falkiewicz
7,357,594 B2 4/2008 Takamura
7,417,081 B2 8/2008 Nakajima et al.
7,503,724 B2 3/2009 Blacklidge
7,568,835 B2 8/2009 Pils
7,645,114 B2 1/2010 Cannon et al.
7,753,618 B2 7/2010 Constantz et al.
7,811,372 B2 10/2010 Nigen-Chaidron et al.
7,829,053 B2 11/2010 Constantz et al.
7,848,912 B2 12/2010 Bertini
7,849,802 B2 12/2010 Dalrymple
7,918,624 B2 4/2011 Blacklidge

(56) References Cited

U.S. PATENT DOCUMENTS 7,951,857 B2 5/2011 Crews et al.
7,993,442 B2 8/2011 Crews et al.
8,026,380 B2 * 9/2011 Hassan ..... B01F 7/00766 422/198
8,088,845 B2 1/2012 Le Clerc et al.
8,133,316 B2 3/2012 Poncelet et al.
8,193,401 B2 6/2012 McGehee et al.
8,206,500 B1 6/2012 Mathis et al.
8,278,451 B2 10/2012 Becker et al.
8,286,673 B1 10/2012 Recker et al.
8,316,708 B2 11/2012 Horst
8,337,117 B2 12/2012 Vitale et al.
8,404,037 B2 3/2013 Naidoo et al.
8,454,979 B2 6/2013 Mitarai et al.
8,562,864 B2 10/2013 Rodrigues et al.
8,634,970 B2 1/2014 Lee et al.
8,722,771 B2 5/2014 Vaidya et al.
8,783,280 B2 7/2014 Yandle
8,789,564 B2 7/2014 Jividen et al.
8,814,464 B2 8/2014 McDade et al.
8,821,064 B1 9/2014 Morris et al.
8,859,649 B2 10/2014 Ranka
8,926,742 B2 1/2015 Coe
8,968,457 B2 3/2015 Payne
8,979,982 B2 3/2015 Jordan
8,992,118 B2 3/2015 Coe
9,028,602 B2 5/2015 Chughtai et al.
9,115,295 B2 8/2015 Deneuvillers et al.
9,133,581 B2 9/2015 Devenney et al.
9,139,720 B2 9/2015 Avramidis et al.
9,139,733 B2 9/2015 McDade et al.
9,139,953 B2 9/2015 Ahluwalia
9,150,140 B2 10/2015 Girard et al.
9,200,205 B2 12/2015 Bran et al.
9,295,992 B2 3/2016 Zickell
9,347,187 B2 5/2016 Coe
9,376,565 B2 6/2016 Subotic et al.
9,409,336 B2 8/2016 De Amorim Novais Da Costa Nóbrega et al.
9,416,274 B2 8/2016 Frank
9,481,794 B2 11/2016 Cox
9,493,633 B2 11/2016 Rowland et al.
9,513,135 B2 12/2016 MacNeille et al.
9,523,003 B2 12/2016 Williams et al.
9,556,631 B2 1/2017 Brooks et al.
9,597,628 B2 3/2017 Kummerer et al.
9,650,580 B2 5/2017 Merdrignac et al.
9,776,165 B2 10/2017 Tour et al.
9,790,360 B2 10/2017 Puchalski et al.
9,862,820 B2 1/2018 Kim et al.
9,868,855 B2 1/2018 Merck et al.
9,969,884 B2 5/2018 Murthy et al.
9,982,136 B2 5/2018 Cao et al.
10,030,145 B2 7/2018 Severance et al.
10,076,430 B2 9/2018 Klausen
10,127,515 B2 11/2018 Borgerson et al.
10,174,201 B2 1/2019 Avramidis
10,214,617 B1 2/2019 Bruns et al.
10,233,120 B2 3/2019 Flanigan
10,294,616 B2 5/2019 Crupi et al.
10,316,192 B2 6/2019 Kurth et al.
10,323,147 B1 6/2019 Brewster et al.
10,323,148 B1 6/2019 Brewster et al.
10,329,426 B2 6/2019 Kurth et al.
10,337,154 B2 7/2019 Baumrind
10,339,478 B2 7/2019 Grant et al.
10,363,529 B1 7/2019 Alberty
10,442,872 B2 10/2019 Besse et al.
10,449,502 B2 10/2019 Rovani, Jr. et al.
10,527,547 B2 1/2020 Hofko et al.
10,570,286 B2 2/2020 Williams
10,626,050 B2 4/2020 Muncy et al.
10,626,275 B2 4/2020 Coe
10,669,203 B2 6/2020 Franzen et al.
10,669,463 B2 6/2020 Bahr
10,724,183 B2 7/2020 Coe
10,767,033 B2 9/2020 Kluttz et al.
10,793,720 B2 10/2020 Puchalski et al.
10,794,017 B2 10/2020 Coe
10,889,940 B2 1/2021 Crupi
10,961,395 B2 3/2021 Williams et al.
10,982,097 B2 4/2021 Larusso et al.
10,988,617 B2 4/2021 McClellan, Jr. et al.
11,077,045 B2 8/2021 Sen et al.
11,091,642 B2 8/2021 Kurth et al.
11,097,981 B2 8/2021 Reinke et al.
11,124,926 B2 9/2021 Fennell et al.
11,155,696 B2 10/2021 Fini
11,193,243 B2 12/2021 Chesky
11,225,576 B2 1/2022 Jorda et al.
11,274,208 B2 3/2022 Colange et al.
11,365,318 B2 6/2022 Kwon et al.
11,390,750 B2 7/2022 Baumgardner et al.
11,414,549 B2 8/2022 Allen et al.
11,421,109 B2 8/2022 McCurdy et al.
11,427,697 B2 8/2022 Reinke et al.
11,447,637 B2 9/2022 Gabel et al.
11,512,437 B2 11/2022 McDade
RE49,447 E 3/2023 Brewster et al.
11,623,990 B2 4/2023 Baumgardner
11,634,875 B2 4/2023 Fennell et al.
11,655,419 B2 5/2023 Nicholson
11,732,108 B1 8/2023 Hayner
11,814,506 B2 11/2023 Clopotel et al.
2002/0026884 A1 3/2002 Raad
2007/0277430 A1 12/2007 Jones et al.
2009/0036694 A1 2/2009 Hassan et al.
2009/0056201 A1 3/2009 Morgan
2009/0127499 A1 5/2009 Blubaugh et al.
2009/0137705 A1 5/2009 Faucon et al.
2009/0187450 A1 7/2009 Kocis
2009/0226254 A1 9/2009 Jones
2010/0034586 A1 2/2010 Bailey et al.
2010/0048771 A1 * 2/2010 Osborn ..... C08L 95/00 524/70
2010/0062219 A1 3/2010 Richards
2010/0088142 A1 4/2010 El-Bakry et al.
2010/0020918 A1 8/2010 Wiley
2010/0280750 A1 11/2010 Chen
2010/0289654 A1 11/2010 Hunter
2011/0105652 A1 5/2011 Hergenrother
2011/0233105 A1 9/2011 Bailey
2012/0017804 A1 1/2012 Venema et al.
2012/0060722 A1 3/2012 Montpeyroux et al.
2013/0197134 A1 8/2013 Leal et al.
2013/0276668 A1 10/2013 Ranka et al.
2013/0344012 A1 12/2013 Christensen et al.
2014/0270953 A1 9/2014 Duffy
2014/0284520 A1 9/2014 Littich et al.
2014/0310049 A1 10/2014 Goel
2014/0343192 A1 11/2014 Cochran et al.
2014/0356526 A1 12/2014 O'Connell et al.
2015/0012326 A1 1/2015 Furman
2015/0087753 A1 3/2015 Koleas et al.
2015/0307013 A1 10/2015 Tremblay et al.
2015/0324740 A1 11/2015 Shao
2016/0052169 A1 2/2016 Baumrind et al.
2016/0122507 A1 5/2016 Cox
2016/0194581 A1 7/2016 Summers et al.
2016/0236980 A1 8/2016 Mullenbach et al.
2016/0289452 A1 10/2016 O'Connell et al.
2016/0362338 A1 12/2016 Reinke et al.
2016/0376440 A1 12/2016 Naidoo et al.
2017/0096092 A1 4/2017 Cannon
2017/0107376 A1 4/2017 Winship et al.
2017/0114281 A1 4/2017 Gupta et al.
2017/0152384 A1 6/2017 Eijkenboom
2017/0306570 A1 11/2017 Crupi et al.
2017/0349725 A1 12/2017 Broere
2017/0370899 A1 12/2017 Porot et al.
2018/0010305 A1 1/2018 Bentaj et al.
2018/0032926 A1 2/2018 DeLuca
2018/0044529 A1 2/2018 Kurth et al.
2018/0112303 A1 4/2018 Antony

(56) References Cited

U.S. PATENT DOCUMENTS

| | | | |
|---|---|---|---|
| 2018/0148575 | A1 | 5/2018 | Kurth et al. |
| 2018/0200264 | A1 | 7/2018 | Blau et al. |
| 2018/0266578 | A1 | 9/2018 | Baxter |
| 2018/0060808 | A1 | 11/2018 | Borgerson et al. |
| 2018/0340068 | A1 | 11/2018 | McCurdy et al. |
| 2018/0371251 | A1 | 12/2018 | Avramidis et al. |
| 2019/0016965 | A1 | 1/2019 | Aldous |
| 2019/0048191 | A1 | 2/2019 | Leon et al. |
| 2019/0153229 | A1 | 5/2019 | Reinke et al. |
| 2019/0300714 | A1 | 10/2019 | Watson et al. |
| 2019/0375940 | A1 | 12/2019 | Franzen et al. |
| 2020/0002538 | A1 | 1/2020 | Wissel et al. |
| 2020/0032063 | A1 | 1/2020 | Lungren et al. |
| 2020/0050202 | A1 | 2/2020 | Suresh |
| 2020/0094924 | A1 | 3/2020 | Gaziotis et al. |
| 2020/0118068 | A1 | 4/2020 | Turetsky et al. |
| 2020/0123449 | A1 | 4/2020 | Nicholson |
| 2020/0165459 | A1 | 5/2020 | Williams et al. |
| 2020/0265377 | A1 | 8/2020 | Al Dhaheri et al. |
| 2020/0277497 | A1 | 9/2020 | Reinke et al. |
| 2020/0317925 | A1 | 10/2020 | Hassan et al. |
| 2020/0332126 | A1 | 10/2020 | Donelson |
| 2020/0372375 | A1 | 11/2020 | Pathak et al. |
| 2021/0002484 | A1 | 1/2021 | Clopotel |
| 2021/0017386 | A1 | 1/2021 | Reinke et al. |
| 2021/0054210 | A1 | 2/2021 | Hemsley et al. |
| 2021/0079224 | A1 | 3/2021 | Cochran et al. |
| 2021/0095429 | A1 | 4/2021 | Murphy et al. |
| 2021/0139374 | A1 | 5/2021 | Bruns et al. |
| 2021/0147751 | A1 | 5/2021 | Fini et al. |
| 2021/0189133 | A1 | 6/2021 | Grzybowski |
| 2021/0214057 | A1 | 7/2021 | Tsujimoto |
| 2021/0230255 | A1 | 7/2021 | Amadoro et al. |
| 2021/0230818 | A1 | 7/2021 | Fennell et al. |
| 2021/0236815 | A1 | 8/2021 | Waldstreicher et al. |
| 2021/0238093 | A1 | 8/2021 | Eyster |
| 2021/0241221 | A1 | 8/2021 | Pathak et al. |
| 2021/0284574 | A1 | 9/2021 | Kurth et al. |
| 2021/0334650 | A1 | 10/2021 | Celano |
| 2021/0338562 | A1 | 11/2021 | Akthakul et al. |
| 2021/0362637 | A1 | 11/2021 | Hanis |
| 2021/0371339 | A1 | 12/2021 | Dennis et al. |
| 2021/0371567 | A1 | 12/2021 | Vanderhoof et al. |
| 2022/0001345 | A1 | 1/2022 | Ahn et al. |
| 2022/0002548 | A1 | 1/2022 | Wissel et al. |
| 2022/0033305 | A1 | 2/2022 | Cochran et al. |
| 2022/0089832 | A1 | 3/2022 | Yi et al. |
| 2022/0101272 | A1 | 3/2022 | Sunde et al. |
| 2022/0106537 | A1 | 4/2022 | Aritake et al. |
| 2022/0112130 | A1 | 4/2022 | Williams et al. |
| 2022/0153645 | A1 | 5/2022 | Zhou |
| 2022/0243066 | A1 | 8/2022 | Noel |
| 2022/0267602 | A1 | 8/2022 | Cooley et al. |
| 2022/0281212 | A1 | 9/2022 | Bhattacharya et al. |
| 2022/0315766 | A1 | 10/2022 | Baumgardner et al. |
| 2022/0372257 | A1 | 11/2022 | Coe |
| 2022/0389669 | A1 | 12/2022 | Miller |
| 2022/0402819 | A1 | 12/2022 | Mangel et al. |
| 2023/0033496 | A1 | 2/2023 | Townsend et al. |
| 2023/0072410 | A1 | 3/2023 | Inoubli et al. |
| 2023/0085865 | A1 | 3/2023 | Bruns et al. |
| 2023/0086227 | A1 | 3/2023 | Bruns et al. |
| 2023/0092077 | A1 | 3/2023 | Lorenzen et al. |
| 2023/0193031 | A1 | 6/2023 | Clopotel et al. |
| 2023/0193035 | A1 | 6/2023 | Clopotel et al. |
| 2023/0348723 | A1 | 11/2023 | Clopotel et al. |
| 2024/0409815 | A1 | 12/2024 | Clopotel |

FOREIGN PATENT DOCUMENTS

| | | | | |
|---|---|---|---|---|
| CN | 106934143 | A | 7/2017 | |
| CN | 206917912 | | 1/2018 | |
| CN | 111879637 | A | 11/2020 | |
| CN | 111986520 | A | 11/2020 | |
| CN | 113110464 | A | 7/2021 | |
| CN | 113921091 | A | 1/2022 | |
| CN | 114112889 | A | 3/2022 | |
| CN | 114113552 | A | 3/2022 | |
| DE | 4124142 | A1 | 1/1993 | |
| DE | 9213661 | | 1/1993 | |
| DE | 19519539 | | 12/1995 | |
| EP | 0870291 | B1 | 10/1998 | |
| EP | 2290010 | | 3/2011 | |
| EP | 3291206 | A1 | 3/2018 | |
| EP | 3441260 | | 2/2019 | |
| FR | 2478122 | | 9/1981 | |
| GB | 2205104 | | 11/1988 | |
| IN | 293683 | | 3/2018 | |
| KR | 10-2017-0011981 | | 2/2017 | |
| KR | 101952894 | | 2/2019 | |
| KR | 102195378 | B1 | 12/2020 | |
| KR | 102597632 | B1 | 11/2023 | |
| PL | 157791 | | 7/1992 | |
| RU | 1787994 | | 1/1993 | |
| RU | 2123719 | C1 | 12/1998 | |
| SU | 816996 | | 3/1981 | |
| WO | 200055257 | | 9/2000 | |
| WO | 2007068461 | | 6/2007 | |
| WO | WO-2007068461 | A1 * | 6/2007 | ..... C04B 26/26 |
| WO | 2009/147360 | | 12/2009 | |
| WO | 2011034423 | | 3/2011 | |
| WO | 20190234434 | | 12/2019 | |
| WO | 2021254815 | A1 | 12/2021 | |

OTHER PUBLICATIONS

Dataforth Corporation, Application Note: 4-20 mA Transmitters, May 24, 2002, available at http://www.dataforth.com/catalog/bb/152-138011998.pdf.

Raptor Overfill Protection Probe, TPF, Inc., Jun. 3, 2013, available at http://tpftherm.com/pdf/2TPFB.pdf.

Lee et al. A decision support system for vessel speed decision in maritime logistics using weather archive big data, 2017, Elsevier, Computers and Operations Research 98, 330-342 (Year: 2017).

Torralba A. et al., Paper 132—Smart Navigation System for the Port of Seville, Buenos Aires, Argentina, Sep. 7-11, 2015.

Etienne, Mary et al., Intelligent Maritime Modern Ships and Ports, Dell Technologies and Intel Corporation, May 2020.

Negenborn, Rudy et al., Smart Port, Smart ships and the changing maritime ecosystem, SmartPort, Sep. 2018.

Lind, Mikael et al., Sea Traffic Management—Beneficial for all Maritime Stakeholders, Transportation Research Procedia, Dec. 2016.

Xiao, Yi et al., Digital empowerment for shipping development: a framework for establishing a smart shipping index system, Maritime Policy & Management, Feb. 27, 2021.

Tian Zhe et al., The Development of Key Technologies in Applications of Vessels Connected to the Internet, Symmetry, 2017.

Van Westrenen et al., Maritime traffic management: a need for central coordination?, Springer-Verlag London Limited 2012.

Emco Wheaton, Vapor Transfer Vents, 2020. https://www.gardnerdenver.com/en-us/emcowheaton/fuel-systems/tank-truck-equipment/vapor-transfer-vents.

Sun, Zhaojie et al., Investigation of the potential application of biodiesel by-product as asphalt modifier, Road Materials and Pavement Design 17(3):1-16, Oct. 2015.

* cited by examiner

| Test | Sample A PG64-22 | Ester Bottoms | Sample B PG64-22 | Ester Bottoms | Sample C SDA | Ester Bottoms | Ester Bottoms | Sample D SDA | Ester Bottoms | Ester Bottoms |
|---|---|---|---|---|---|---|---|---|---|---|
| Percent | 0% | 3% | 0% | 3% | 0% | 2.25% | 5.77% | 0% | 3.70% | 7.10% |
| UTR, C | 90C | 89.7 | 91.6 | 91.4 | 85.7 | 87.8 | 89 | 87.4 | 89.8 | 88.8 |
| OB HTC | 65 | 60.1 | 67.7 | 62.4 | 67.7 | 64.2 | 58.2 | 71.6 | 65.2 | 58.5 |
| RTFO HTC | 67.4 | 62.1 | 68.9 | 63.7 | 69.9 | 67.1 | 60.4 | 73.5 | 67.3 | 61.7 |
| Jnr@3.2kPa | 2.859 | 2.6 | 2.331 | 2.142 | 1.883 | 2.946 | 3.272 | 1.098 | 2.8658 | 2.904 |
| %Rec@3.2kPa | 1 | 1.1 | 0.6 | 0.8 | 2.2 | 1.2 | 0.7 | 4.8 | 0.9493 | 1.1 |
| Jnr diff | 15.3 | 16.5 | 11.7 | 10 | 16.2 | 17.5 | 18.2 | 13.7 | 12.6648 | 17.3 |
| RV @135 | 392 | 302 | 448.3 | 338.3 | 449 | 362.5 | 258 | | 392.5 | 285 |
| RV @165 | 119 | 97 | 123.3 | 103.3 | 132 | 106.7 | 88.3 | | 120 | 92.5 |
| Flash, COC, C | 328 | 320 | 328 | 310 | | | | 359 | | 338 |
| Penetration | | | | | 49 | 72.4 | | 49.5 | 78.4 | |
| Mass Change | -0.22 | -0.3 | -0.47 | -0.63 | 0.09 | 0.075 | -0.115 | | -0.084 | -0.187 |
| Aging Ratio @ 64C | 3.03 | | 2.63 | | | 3.25 | | | 2.92 | |
| Aging Ratio @ 58C | | 2.9 | | 2.68 | | | 2.96 | | | 3.18 |
| PAV ITC | 3362 | 3720 | 3904 | 4314 | 4220 | 2768 | 2569 | 5542 | 2868 | 2605 |
| BBR@-6C m value | 0.32 | | | | 0.307 | | | 0.299 | | |
| BBR@-6C Stiffness | 136 | | | | 83.5 | | | 108 | | |
| BBR@-12C m value | 0.32 | | 0.33 | | 0.286 | 0.308 | | 0.27 | 0.316 | |
| BBR@-12C Stiffness | 136 | | 242 | | 159 | 116 | | 214 | 124 | |
| BBR@-18C m value | 0.28 | 0.31 | 0.262 | 0.322 | 0.286 | 0.278 | 0.316 | | 0.279 | 0.312 |
| BBR@-18C Stiffness | 266 | 183 | 474 | 258 | 159 | 239 | 144 | | 232 | 152 |
| BBR@-24C m value | -29.1 | 0.272 | | 0.242 | | | 0.282 | | | 0.281 |
| BBR@-24C Stiffness | -25 | 356 | | 636 | | | 282 | | | 294 |
| LTC-S | -29.1 | -32.5 | -23.9 | -29 | -27.9 | -29.9 | -34.6 | -25 | -30.5 | -34.2 |
| LTC-m | -25 | -29.6 | -24.6 | -29.6 | -18 | -23.6 | -30.8 | -15.8 | -24.6 | -30.3 |
| delta LTC (s-m) | -4.1 | -2.9 | 0.7 | 0.6 | -9.9 | -6.3 | -3.8 | -9.2 | -5.9 | -3.9 |

FIG. 4

| Test | Sample E | Ester Bottoms | Ester Bottoms | Sample F | Ester | Ester |
|---|---|---|---|---|---|---|
| Percent | 0% | 8.20% | 11.50% | 0 | 6.30% | 9.60% |
| UTR, C | 96.4 | 94.2 | 91.8 | 94.5 | 92.7 | 91.5 |
| OB HTC | 80.4 | 64.4 | 58.7 | 76.5 | 64.7 | 59 |
| RTFO HTC | 81.4 | 66 | 60.5 | 77.3 | 65.4 | 59.9 |
| Jnr@3.2kPa | 0.3405 | 3.675 | 3.512 | 0.638 | 3.862 | 3.702 |
| %Rec@3.2kPa | 11.5843 | 0.1 | 0.1 | 6.7 | -0.1 | -0.2 |
| Jnr diff | 2.9573 | 12.7 | 11.3 | 8.7 | 12.3 | 14.5 |
| RV @135 | 1025 | 418 | 305 | 812.5 | 420 | 310 |
| RV @165 | 242.5 | 125 | 97.5 | 202.5 | 127.5 | 101 |
| Flash, COC, C | 347 | | 328 | 350 | | 322 |
| Penetration | 22.5 | 113 | | 25.9 | 90.6 | |
| Mass Change | 0.034 | -0.169 | -0.468 | | -0.263 | -0.365 |
| Aging Ratio @ 64C | 76 2.57 | 2.68 | | 2.41@76C | 2.41 | |
| Aging Ratio @ 58C | | | 2.76 | | | 2.46 |
| PAV ITC | 34.4C | 2640 | 2541 | 30.6C | 2079 | 2257 |
| BBR@-6C m value | 0.3 | | | 0.32 | | |
| BBR@-6C Stiffness | 276 | | | 188 | | |
| BBR@-12C m value | 0.24 | | | 0.262 | 0.374 | |
| BBR@-12C Stiffness | 530 | | | 390 | 122 | |
| BBR@-18C m value | | 0.318 | 0.38 | | 0.3 | 0.354 |
| BBR@-18C Stiffness | | 238 | 147 | | 302 | 168 |
| BBR@-24C m value | | 0.258 | 0.298 | | | 0.282 |
| BBR@-24C Stiffness | | 492 | 338 | | | 355 |
| LTC-S | -16.8 | -29.9 | -33.1 | -19.8 | -28 | -32.6 |
| LTC-m | -16 | -29.8 | -33.9 | -18 | -28 | -32.5 |
| delta LTC (s-m) | -0.8 | -0.1 | 0.8 | -1.8 | 0 | -0.1 |

FIG. 5

| DCT FRACTURE ENERGY AT -12°C | | | |
|---|---|---|---|
| AVERAGE OF 3 SPECIMENS | Test Data (J/m-2) | Peak Load (kN) | Time of Peak Load(s) |
| BINDER 2 | 433.1 | 3 | 7.8 |
| BINDER 3 | 464.2 | 3.2 | 8.5 |
| BINDER 4 W/ ADD. | 494.5 | 3.1 | 7.2 |

| | Peak Load (kN) | Fracture Energy GF (J/m^2) | Flexibility Index |
|---|---|---|---|
| Binder 2 | 2576.6 | 1760 | 9.91 |
| Binder 3 | 2556.8 | 1867 | 12.14 |
| Binder 4 | 2432.1 | 1795 | 12.42 |

METHOD OF MAKING AN ASPHALT COMPOSITION CONTAINING ESTER BOTTOMS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

[The present patent application is based upon and claims the benefit of provisional patent application No. 62/341,700, filed on May 26, 2016.] *The present patent application is a divisional reissue application of U.S. Reissue application Ser. No. 17/345,859, filed Jun. 11, 2021, which is a reissue application for U.S. Pat. No. 10,323,148, issued on Jun. 18, 2019, from U.S. application Ser. No. 15/586,860, filed May 4, 2017, which is a non-provisional application claiming priority to and the benefit of U.S. Provisional Application No. 62/341,700, filed May 26, 2016. The content of the above-identified applications is incorporated herein by reference in its entirety. The reissue application numbers are U.S. Reissue application Ser. No. 17/345,859, now U.S. Pat. No. RE 49,447, and U.S. Reissue application Ser. No. 18/101,464, the present application, which is a divisional reissue application of U.S. Reissue application Ser. No. 17/345,859. Notice: More than one reissue application has been filed related to U.S. Pat. No. 10,323,148.*

FIELD OF THE INVENTION

The invention relates to asphalt compositions and the process for the improvement of their properties. The invention further relates to a modified asphalt composition useful for a variety of applications, particularly paving asphalt and for construction materials utilizing such compositions.

BACKGROUND OF THE INVENTION

The invention relates to an asphalt paving composition made with ester bottoms. [The Environmental Protection Agency provides a discussion of asphalt roads at http://www.epa.gov/ttn/chief/ap42/cho4/final/c4s05.pdf which is incorporated herein by reference.]

Ester bottoms are a low value by-product of vegetable oil or animal fat refining to produce methyl ester. There is little known value for ester bottoms and they are currently marketed for animal feed, lubricants, or other industrial uses at a low price point.

Asphalt materials are used in a wide variety of applications including but not limited to paving asphalt and asphalt shingles. Paving asphalt must be sufficiently durable to withstand high and low temperature extremes without undue wear, cracking or melting. Paving asphalt hardens while in service (age hardening). Age hardening is caused by an increase in viscosity of the asphalt mixture and the gradual loss of flexibility. The degree and the rate of the hardening of the paving asphalt composition or cement are factors affecting the durability of an applied surface. It is believed that the reaction of the asphalt composition with atmospheric oxygen is the principle cause of asphalt hardening in pavement. Therefore, the asphalt industry has long sought to reduce age hardening.

Some conventional refined asphalts have been found to be incapable of reacting some requirements for resistance to either low temperature thermal cracking or high temperature rutting resistance in certain climates. Modifiers such as elastomers, plasterers, chemical gellants, and chemical modifiers can be effective in improving either, or sometimes both, low temperature thermal cracking or high temperature rutting resistance. These modifiers have varying levels of effectiveness and cost.

Conventional practice to improve low temperature properties adds softer asphaltic compounds, aromatic oils, or other additives to soften or plasticize the asphalt composition. In order to reach acceptable low temperature properties, excessive amounts of soft asphaltic materials or fluxes may be required In addition, aromatic oils used in combination with polymers can improve the rutting resistance of asphalt. However, many times, the level of polymer required to reach the desired level of rutting resistance becomes undesirable as a result of excessive cost, rendering the composition not feasible for use as a paving composition.

Asphalt compositions may be derived, as indicated from any well-known bituminous or asphaltic substance obtained from natural sources or derived from a number of sources such as, shale oil, coal tar, and the like as well as the mixtures of two or more of such materials. As indicated, paving grade asphalt compositions are preferred in the present invention. Such paving asphalt compositions are often referred to as viscosity, penetration graded, or performance graded (PG) asphalts having penetration up to 400 as measured by ASTM method D5.

As a result of the 1987 Intermodal Surface Transportation Efficiency Act (ISTEA), a $150 million research study was commissioned in which $50 million was spent towards asphalt research for improving asphalt pavements. As a product of that research which was concluded in 1992, the Strategic Highway Research Program (SHRP) produced what is now known as the Superpave Performance Graded Binder Specification in which asphaltic binders are graded or characterized according to their relative performance in resistance to rutting, shoving or deformation at high temperatures, fatigue at intermediate temperatures, and thermal cracking resistance at low temperatures. Asphalts which normally would be graded either under the penetration or viscosity specifications are now graded as PG (Performance Graded) binders. As such, their designation will be representative of their resistance at both high and low temperature, indicating their useable temperature range (UTR) as a PG AA-BB where AA=high temperature resistance in degrees Celsius and BB is low temperature cracking resistance in minus degrees Celsius, i.e., PG 64-22 would prevent rutting up to 64° C. (147° F.) and low temperature cracking to a minus 22° C. (−72° F.). Preferred asphalts are the performance graded asphalts such as PG 46-40; PG 48-34; PG 46-28, PG 52-40; PG 52-34; PG 52-28; PG 52-22, PG 58-40, PG 58-34, PG 58-28, PG PG 58-22, PG 64-40, PG 64-34, PG64-28, PG 64-22, PG 70-40, PG 70-34, PG 70-28, PG 70-22, PG 76-40, PG 76-34, PG 76-28, PG 76-22, PG 82-34, PG 82-28, or PG 82-22. The PG in the title referring to Performance Graded, the first numeric designation referring to the binders high temperature rutting or deformation resistance temperature range limit. The last numeric designation references the cracking resistance temperature limit of the binder.

Areas of high loading or slow or standing traffic as well as areas where temperature extremes can be experienced in excess of 86° C. (187° F.) between high and low temperature levels will require the use of modifiers to obtain the increased useful temperature range. As a result, it has been common to start with softer asphalts to reach low temperature properties, while adding modifiers such as polymers to achieve high temperature rutting resistance. The use of aromatic oils also aids low temperature properties. As such, extensive levels of polymer addition is required to regain high temperature properties, especially when using aromatic oils. The use of aromatic oils can solvate the polymer to a higher degree and thus require a higher level of polymer to be used to obtain the desired high temperature rutting resistance.

A common practice of softening asphalts in the industry is to add heavy vacuum gas oil (HVGO) to paving asphalt to reach the desired useable temperature range (UTR). HVGO may be added after refining or, in some applications, it is not refined out of the asphalt materials. HVGO is a valuable commodity currently selling at about $150/ton premium over the price of asphalt, depending on the market. Therefore, adding HVGO to asphalt is an undesirable fix as it increases the cost of paving asphalt.

Notwithstanding the considerable efforts previously expended to provide an improved asphalt paving composition, there remains a continued need to increase the useable temperature range and reduce the cost associated with manufacturing asphalt paving materials. The present invention addresses both of these needs.

SUMMARY OF THE INVENTION

In producing methyl esters, including biodiesel, a feedstock containing all or a portion of vegetable oil or animal fats is reacted and refined to produce finished products. As a part of this process, a number of by-products are produced, having varying degrees of value. On the low end of the value spectrum are ester bottoms. Ester bottoms are a co-product of refining methyl ester, including biodiesel, that is not glycerin or skimmed fatty acids. Ester bottoms generally contain methyl esters, monoglycerides, diglycerides, triglycerides, sodium soaps produced from the addition of sodium methoxide (catalyst), and unsaponafiables. The unsaponafiables generally make up about 10% of the ester bottoms. Ester bottoms, as used in the preferred embodiment of this invention, have a viscosity range 10-900 cP at 64 degrees Celsius.

In the preferred embodiment, the invention involves the addition of ester bottoms to an asphalt paving composition to improve the useable temperature range (UTR). Very specifically, the ester bottoms affect the low temperature properties more significantly than the high temperature properties. Generally, the modified asphalt composition will comprise (a) about 0.1% to about 50% of ester bottoms, (b) about 0 to about 20% of a polymer modifier, (c) 50 to about 99.9% of an asphalt obtained from conventional vacuum distillation, solvent refining or naturally occurring mineral sources.

Refiners, or user producers, will often add a polymer to paving asphalt to increase the high temperature property of the paving asphalt for warmer climates. The ester bottom modified asphalt paving composition increases the useful temperature range. Therefore the amount of polymer additive required to reach a desirable higher temperature range can be reduced, thus reducing the cost of manufacturing pavement asphalt.

Another advantage of the invention is the amount of ester bottoms used to produce a desired finished product is less than the amount of HVGO (heavy vacuum gas oil), or other modifiers currently available, required to produce an equivalent amount of finished product.

A typical paving asphalt mixture comprises a mixture of components. Principal ingredients of the paving asphalt mixture are an asphalt composition or cement and aggregate or aggregate material. In such mixtures, the ratio of asphalt composition to aggregate material varies, for example, according to the aggregate material type and the nature of the asphalt composition. As used herein, the terms "asphalt composition", "asphalt cement" or "asphalt binder" are understood to refer to any of a variety of organic materials, solid or semi-solid at room temperature, which gradually liquefy when heated, and in which the predominate constituents are naturally occurring bitumen, e.g., Trinidad Lake, or residues commonly obtained in petroleum, synthetic petroleum, or shale oil refining, or from coal tar or the like. For example, vacuum tower bottoms produced during the refining of conventional or synthetic petroleum oils is a common residue material useful as an asphalt composition. A "paving asphalt composition", "paving asphalt cement", or "paving asphalt binder", accordingly is an asphalt composition or asphalt cement having characteristics which dispose the composition to use as a paving material. This is contrasted, for example, with an asphalt composition suited for use as a roofing material. "Roofing asphalts", usually have a higher softening point, and are thus more resistant to flow from heat on roofs. The higher softening point is generally imparted by the air blowing processes by which they are commonly produced. Paving asphalt mixtures may be formed and applied in a variety of ways, as well understood by those skilled in the art. For example, the paving asphalt composition and the aggregate can be mixed and applied at elevated temperatures while in the fluid state to form the pavement or road surface. See particularly U.S. patent application Ser. No. 5,580,376 to Hayner.

Some examples of polymers used for modifying asphalts include: Styrene Butadiene (SB), ethylene-vinyl-acetate, ethylene-methyl-acrylate, ethylene butyl acrylate, poly-propylene, atactic polypropylene, polystyrene, polyethylene, LDPE, HDPE, oxidized high density poly-propylene, polyphosphoric acid (PPA), natural rubber, polybutadiene, epoxy resins, polyurethane resins, acrylic resins, phenolic resins, gilsonite, lignin, diblock polymers, Styrene-Butadiene-Styrene (SBS), triblock polymers which may be either linear or radial, styrene-isoprene-styrene (SIS), diblocked polymers, hydrotreated SBS, Styrene Ethylene Butadiene Styrene polymers (SEBS), Styrene Butadiene Rubber (SBR), polyacrylamide, e.g., those described in U.S. Pat. No. 4,393,155; Glycidyl-containing ethylene copolymers in U.S. Pat. No. 5,331,028; or Crum Rubbers.

Asphalt is the most recycled material in the world. Milled road surfaces are reused. Many new roads are composed of 20% recycled asphalt and as high as 60% in some applications. The reclaimed asphalt is highly oxidized from years of use, and can be rejuvenated. There are rejuvenators currently on the market at a high price point. Another advantage of the invention is the ester bottoms can be used as a rejuvenator for recycled asphalt.

The ester bottom modified asphalt may have many desirable applications including but not limited to paving asphalt, asphalt emulsions, cutback asphalts, and roofing flux.

Other objects and advantages of the present invention will become apparent to those skilled in the art upon a review of the following detailed description of the preferred embodiments and the accompanying drawings.

IN THE DRAWINGS

FIG. 4 is a table of test results on a number of different asphalt compositions when mixed with various amounts of ester bottoms.

FIG. 5 is a table of test results on a number of different asphalt compositions when mixed with various amounts of ester bottoms.

DETAILED DESCRIPTION OF THE INVENTION

Figure 1:
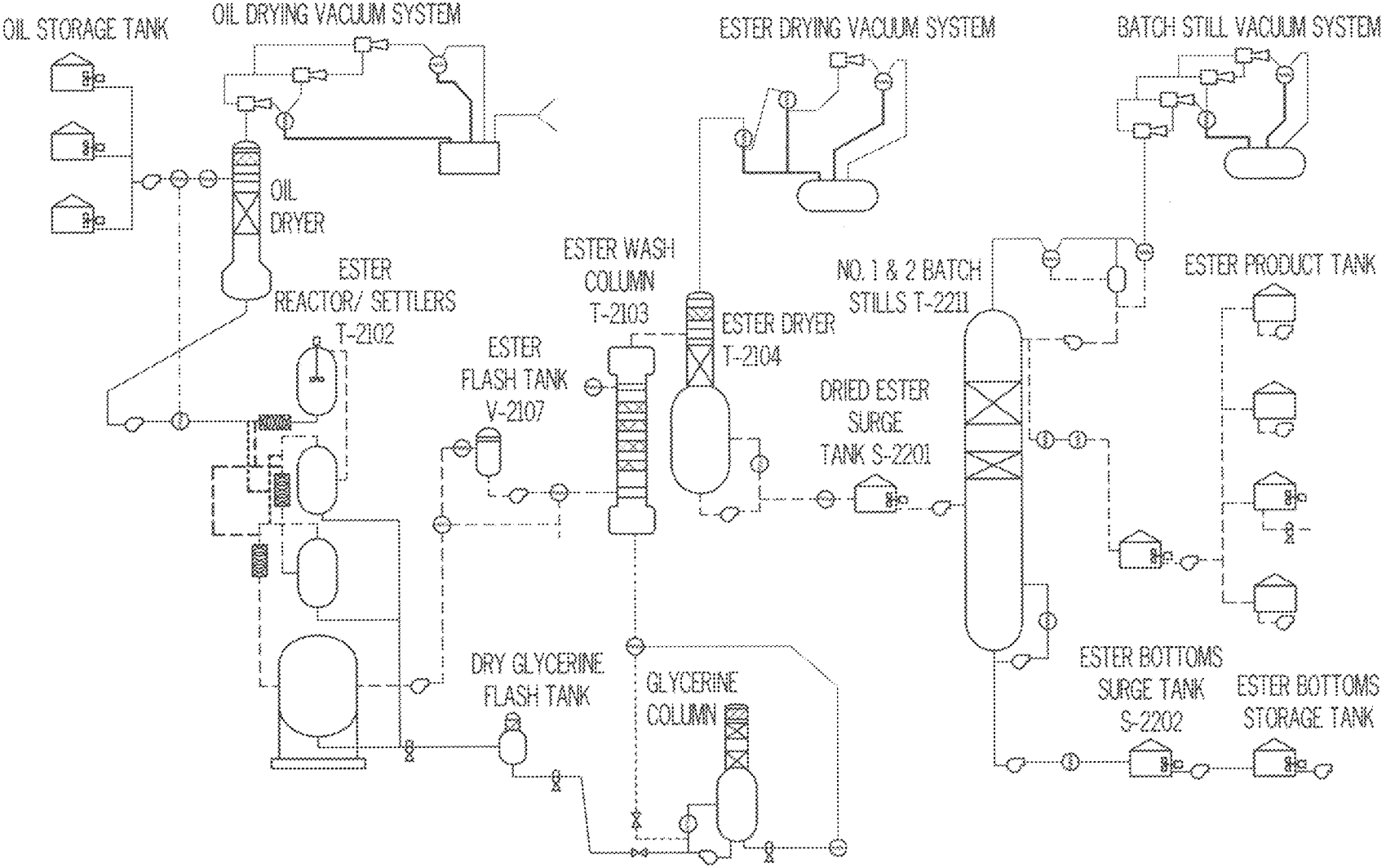
FIG. 1 is a schematic flow diagram for bio-refining.

Referring to FIG. 1 feedstock is brought from the storage tanks to the dryer (T2101) wherein moisture is removed. This dry oil is then fed into a three-stage continuous reactor/settler system (T2102) where methoxide catalyst and methanol are added to each stage. Methanol reacts with the dry oil to produce methyl ester and glycerin. The dry oil is reacted to less than 1% monoglyceride and virtually no diglycerides or triglycerides as it leaves the last settler. Glycerin settles out of the of the reaction mixture and is directed from the reactors downstream for further refining. The ester phase is what remains after the glycerin is removed. The ester phase is then transferred to a single stage flash distillation tank (V-2107) to remove any remaining methanol. The ester phase is then water washed (T2103) to remove glycerin, soap, methanol, and methoxide catalyst. The washed methyl esters are dried under vacuum (T2104) to remove more methanol and water. Sodium methoxide is added to the dryer to back react any glycerin and monoglycerides into diglycerides and triglycerides. The methyl esters leave the ester dryer and are preheated before entering an ester surge tank (S2201). The methyl esters from the ester surge tank are then distilled to separate the purified methyl esters from the ester bottoms. The ester bottoms are transferred from the distillation tower (T2211) to an ester bottom surge tank (S2202) while the purified methyl ester is transferred from the distillation tower to a storage tank for distribution or sale.

The ester bottoms produced in methyl ester refining are added to any suitable asphalt composition or cement, for example, industrial asphalts used for coatings, sealants, roofing materials, adhesives, and other applications. However, paving grade asphalts are used in the preferred embodiment of the invention. The asphalt feed composition will determine the amount of ester bottoms required.

Figure 2:
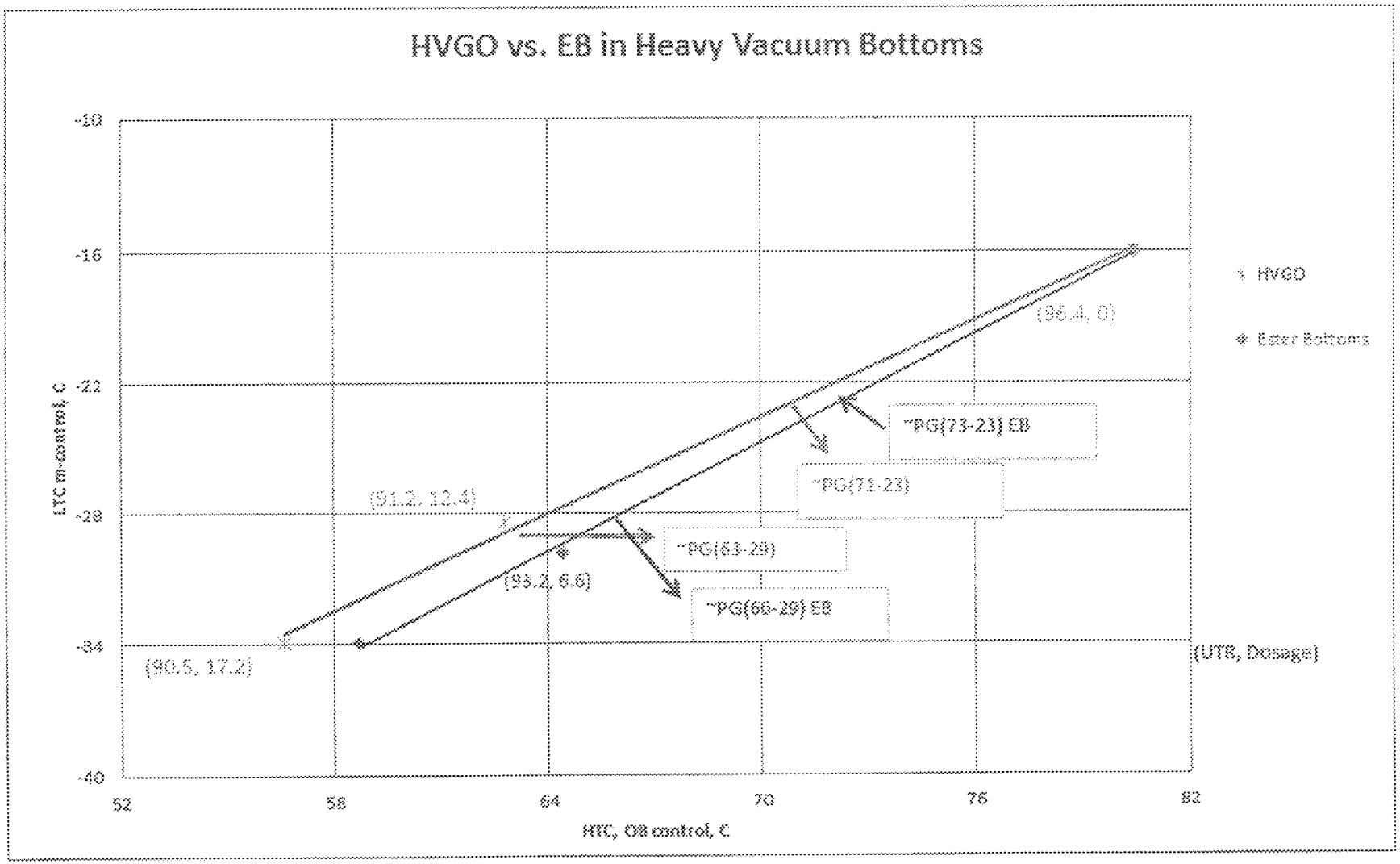
FIG. 2 is a plot of ester bottoms vs. HVGO in asphalt.

Referring now to FIG. 2, there is illustrated a comparison of heavy vacuum gas oil modified asphalt compared with ester bottoms modified asphalt. It can be seen in FIG. 2 that, at similar points, the ester bottoms modified asphalt produces a PG73-23 (UTR=96) versus a HVGO PG71-23 (UTR=94). Similarly, the higher the quantity of modifiers in the asphalt, the ester bottoms produce PG66-29 (UTR=95) versus an HVGO PG63-29 (UTR=92). The ester bottoms modified asphalt presents an improved UTR when compared with HVGO modified asphalts.

Figure 3:
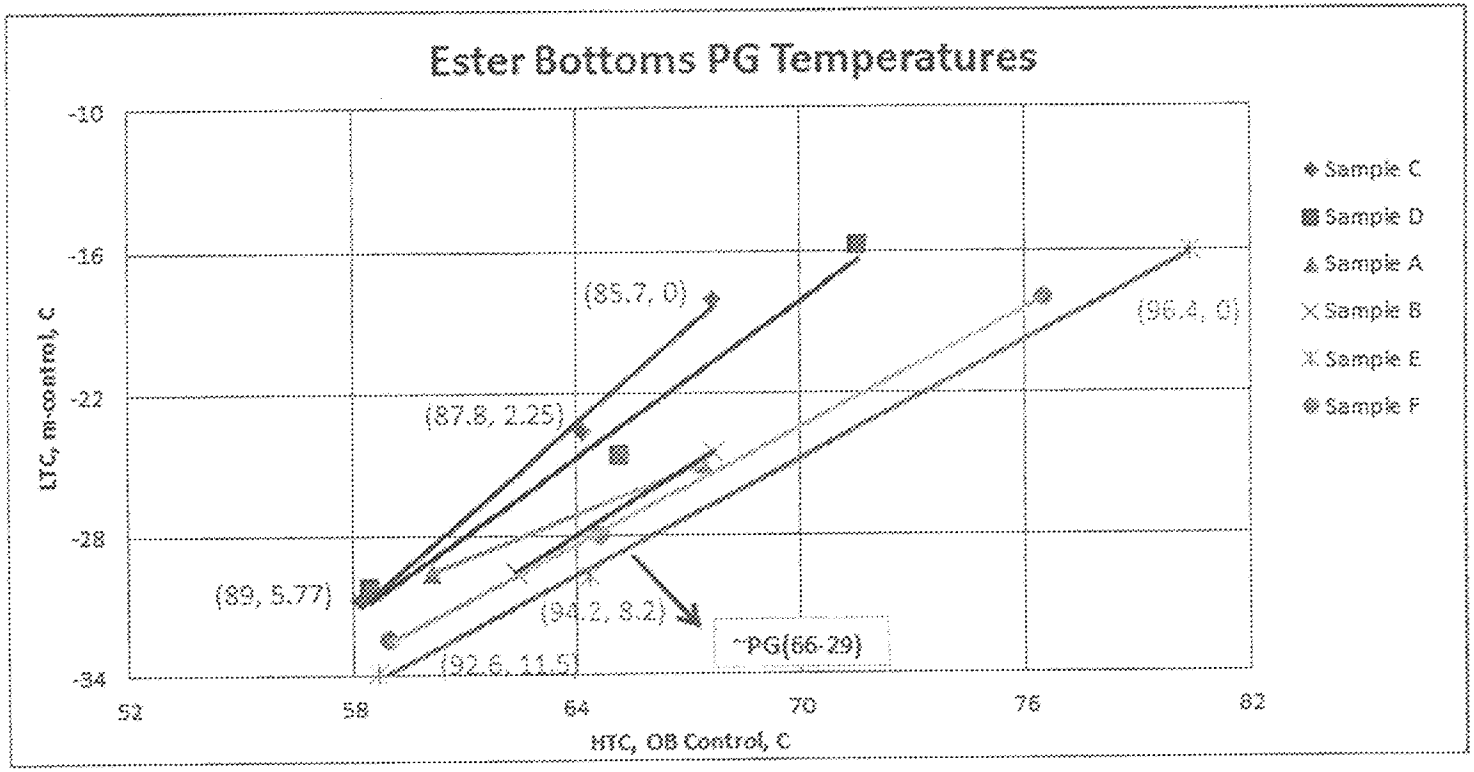
FIG. 3 is a plot of ester bottoms PG temperatures for a number of different asphalt compositions.

The type of asphalt used for the present invention can vary as illustrated by FIGS. 3 and 4. The asphalts may include solvent deasphalting bottoms (SDA). FIGS. 3 and 4 illustrate testing which was done on a PG64-22 (Sample A), PG64-22 (Sample B), and two SDA blends (Samples C and D), and two stiff vacuum tower bottoms blends (Samples E and F). For instance, asphalt from two different refineries (Samples A&B), mixed with 3% ester bottoms resulted in different end products. Similarly, ester bottoms added to SDA or coker feeds affect the finished products differently. Therefore, the weight percentage of ester bottoms required for blending is determined by the asphalt composition.

EXAMPLE 1

Referring now to FIG. 4 a conventional PG 64-22 (Sample A) is used. The control sample at high temperature is approximately 65° C., and the low temperature compliance is actually −25° C. Ester bottoms are added to the Sample A and the resulting product has a high temperature compliance of 60.1° C. and a low temperature compliance of −29.6° C. The useable temperature range of the control equals 86° C. whereas the ester modified composition has a useable temperature range of 89.7° C.

EXAMPLE 2

Referring to FIG. 4, Sample B PG 64-22 has an initial high temperature control of 67.7° C. and the low temperature control is −24.6° C. resulting in a UTR of 92.3. After the addition of 3% ester bottoms the high temperature compliance is 62.4° C. and the low temperature compliance is −29.9° C. resulting in a useable temperature range of 93.2° C., while lowering the lower temperature compliance significantly.

EXAMPLE 3

Referring again to FIG. 4, Samples C & D, SOA blends, were tested. Sample C having a high temperature compliance of 67.7° C. and a low temperature compliance of −18° C. Ester bottoms were added in the amount of 2.25% and 5.77%. The 2.25% ester bottoms addition resulted in a UTR of 87.8° C., while the 5.77% ester bottoms addition resulted in a UTR 89° C. In the Sample D test the 3.70% ester bottoms addition resulted in an 89.8° C. UTR and a 7.1% ester bottoms addition resulted in an 88.8° C. UTR.

It can be seen from FIGS. 2-4 that ester bottoms modified asphalts are at least as good as, if not better at maintaining a UTR than the more expensive HVGO and SDA modified asphalts.

Referring now to FIG. 5, tensile strength testing was employed against three SDA modified binders (1, 2, 3) in comparison with an ester bottoms modified binder (4). Moisture sensitivity results for the three SDA modified PG64-22 asphalts and the ester bottoms modified blend show that the ester bottoms modified blend competed very well against binders 1, 2 and 3. Both dry and wet strains are very strong. During this test a disk-shaped sample of the binder is pulled apart to measure the crack initiation and propagation. By measuring the area under the load and the displacement curve, fracture energy is calculated for the sample. This test provides an understanding of a mixture's ability to resist cracking at both low and intermediate temperatures.

Figure 6:
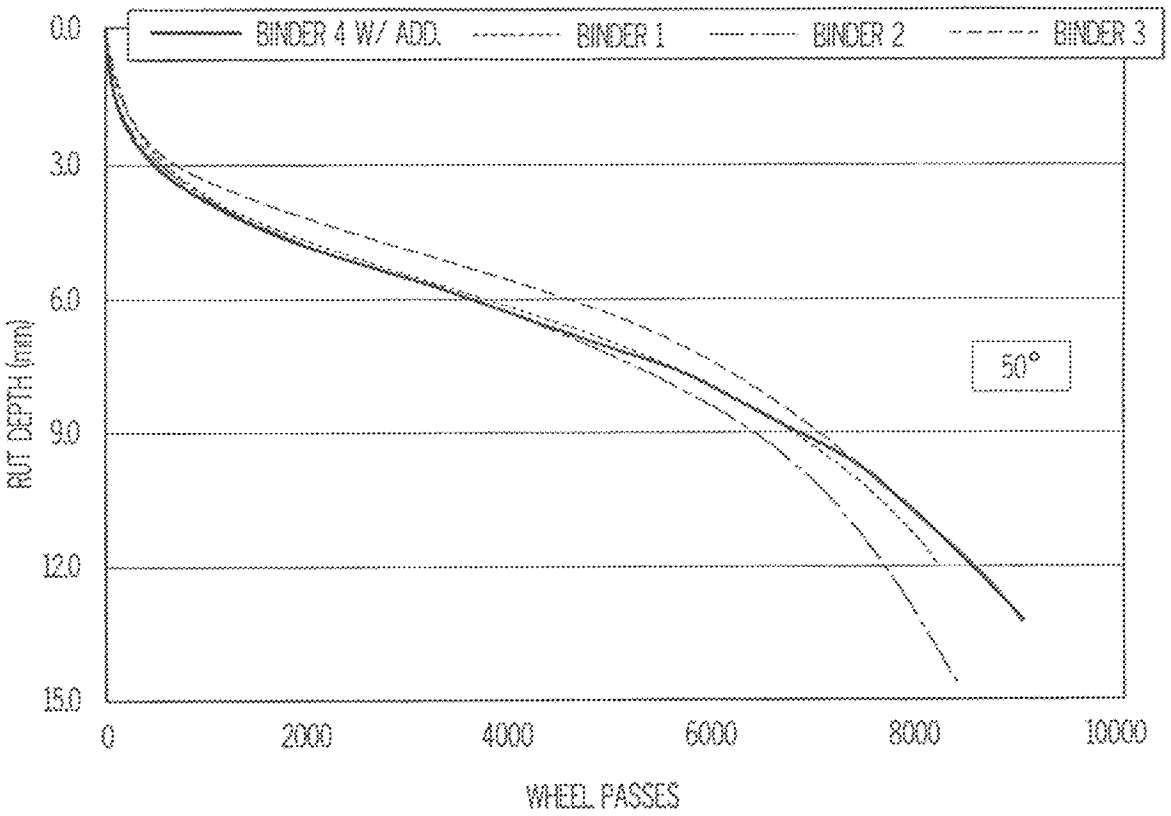
FIG. 6 is a plot of results of tensile tests comparing an ester bottom modified asphalt with three polymer modified asphalts.

Referring now to FIG. 6 the results of a rutting resistance test, known as the Hamburg Wheel Test, compares binders 1, 2 and 3 against ester modified binder 4. Again, the ester modified binder 4 performs favorably when compared to the other refinery produced PG64-22. The test is performed by repeatedly tracking a loaded wheel over samples in heated bath water. The deformation of the samples versus the number of passes is observed. The Hamburg Wheel Test is used to measure both rutting and stripping risks.

Figure 7:
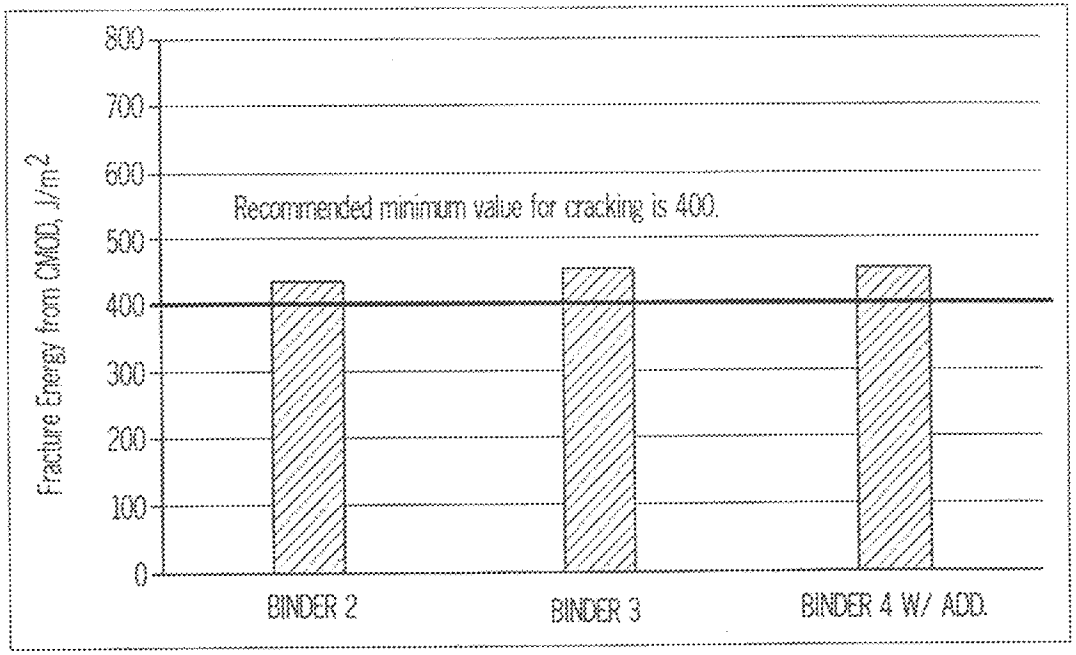
FIG. 7 is a plot of results of a rutting resistance test of an ester bottom modified asphalt with three polymer modified asphalts.

Referring now to FIG. 7 the results of a Disk Shaped Compaction Tension test (DCT) are shown. The DCT is a measure of low temperature and reflective cracking. Binder 4 with the ester bottoms additive was compared against binders 2 and 3. Binder 4 again provided results equal and favorable to the refinery binders. During this test, one set of samples is tested as it exists. For this test, two sets of each binder are tested. One set of the mixed binders are tested as is under dry conditions. The second set of test binders is put through a freeze/fall cycle and is then conditioned in water. The strength for each mix is measured from the load required to crack the sample. The reported number of this graph is the strength ratio of the wet versus dry condition. This strength ratio provides information regarding the moisture susceptibility of the asphalt mix.

Figure 8:
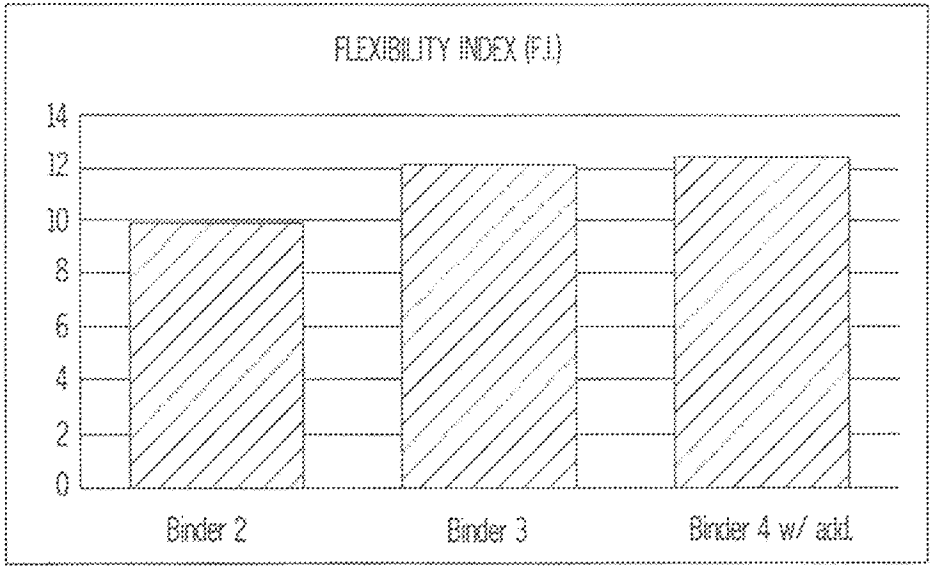
FIG. 8 is a plot of results of a compaction tension test comparing an ester bottom modified asphalt with two polymer modified asphalts.
Figure 9:
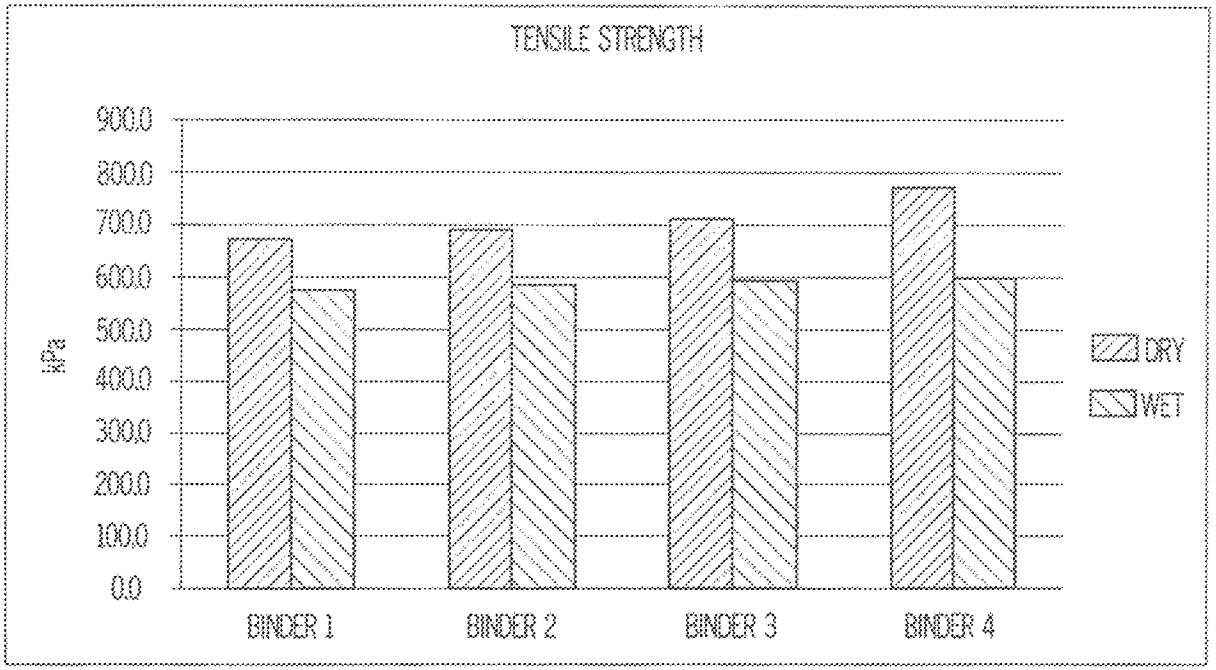
FIG. 9 is a plot of a Semi Circular Bend test comparing an ester bottom modified asphalt with two polymer modified asphalts.

FIG. 8 provides the results of a Semi Circular Bend test against binder 2, binder 3 and binder 4 with ester bottoms. This test provides an indicator of resistance to crack propagation and predicts fracture performance. The test shows that binder 4 with ester bottoms additive performed better than binders 2 and 3. The test is performed by 3 point bending of a semi-circular shaped specimen with an introduced notch. This induces tension at the bottom of the sample, resulting in crack propagation throughout the specimen. The energy required to fracture the sample is calculated. The test is run at normal temperatures.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

[1. A method of making paving asphalt comprising:

adding 0.1 wt % to 20 wt % ester bottoms to an asphalt mixture wherein the ester bottoms are a byproduct of methyl ester refining; and adding 0-20 wt % of a polymer modifier to the ester bottoms and asphalt mixture.]

[2. The method according to claim 1 wherein the ester bottoms contain methyl esters, sodium soap, monoglycerides, diglycerides, triglycerides, and unsaponifiables.]

[3. The method according to claim 2 wherein the unsaponifiables make up about 10 wt % of the ester bottoms.]

[4. The method of claim 1 wherein the ester bottoms have a viscosity range of 10-900 cp at 64° C.]

[5. A method of making a paving asphalt comprising adding ester bottoms to an asphalt mixture to increase the useable temperature range of the paving asphalt, wherein the ester bottoms are a byproduct of methyl ester refining.]

[6. A method of making a paving asphalt comprising adding ester bottoms to an asphalt mixture to meet a predetermined useable temperature range, wherein the ester bottoms are a byproduct of methyl ester refining.]

*7. A modified asphalt composition comprising:*

*50 wt % to about 99.9 wt % of an asphalt;*

*0 wt % to about 20 wt % of an asphalt-modifying polymer; and*

*0.1 wt % to about 50 wt % of ester bottoms, the ester bottoms being defined as distillation bottoms of distilled reaction products from reaction of methanol and dry oil that have settled glycerin removed therefrom prior to distillation.*

*8. The modified asphalt composition of claim 7, wherein the ester bottoms include unsaponifiables in an amount of at least about 10% thereof.*

*9. The modified asphalt composition of claim 7, wherein the ester bottoms are without skimmed fatty acids.*

*10. The modified asphalt composition of claim 7, wherein the ester bottoms include one or more sodium soaps.*

*11. The modified asphalt composition of claim 7, wherein the ester bottoms have a viscosity range of between about 10 cP and about 900 cP at 64° C.*

*12. The modified asphalt composition of claim 7, wherein the ester bottoms include diglycerides and triglycerides.*

*13. The modified asphalt composition of claim 7, wherein the asphalt includes from about 20 wt % to about 60 wt % recycled asphalt.*

*14. The modified asphalt composition of claim 7, wherein the asphalt-modifying polymer has one or more monomers selected from the group consisting of butadiene, styrene, vinyl acetate, ethylene, propylene, acrylate, isoprene, and acrylamide.*

*15. The modified asphalt composition of claim 7, wherein a useable temperature range of the modified asphalt composition is greater than an asphalt composition without ester bottoms.*

*16. The modified asphalt composition of claim 7, wherein the dry oil includes one or more of a vegetable oil or an animal fat that has been at least partially dried to remove moisture therefrom.*

*17. A modified asphalt composition comprising:*

*50 wt % to about 99.9 wt % of an asphalt;*

*0 wt % to about 20 wt % of a polymer modifier; and*

*0.1 wt % to about 50 wt % of ester bottoms, the ester bottoms being defined as distillation bottoms of a water-washed reaction product between methanol and dry oil from which settled glycerin is removed from the water-washed reaction product prior to distillation, the dry oil containing one or more of a vegetable oil or an animal fat that has been dried to remove at least some moisture therefrom.*

*18. The modified asphalt composition of claim 17, wherein the ester bottoms include unsaponifiables in an amount of at least about 10% thereof.*

*19. The modified asphalt composition of claim 17, wherein the ester bottoms include one or more sodium soaps.*

*20. The modified asphalt composition of claim 17, wherein the ester bottoms have a viscosity range of between about 10 cP and about 900 cP at 64° C.*

*21. The modified asphalt composition of claim 17, wherein the asphalt includes from about 20 wt % to about 60 wt % recycled asphalt.*

*22. A modified asphalt composition comprising:*

*50 wt % to about 99.9 wt % of an asphalt;*

*0 wt % to about 20 wt % of an asphalt modifier selected from the group consisting of a polymer, a resin, polyphosphoric acid, gilsonite, lignin and crumb rubber; and*

*0.1 wt % to about 50 wt % of ester bottoms, the ester bottoms being defined as distillation bottoms of a water-washed methyl ester reaction product between reagents methanol and at least one of vegetable oil or animal fat from which glycerin is settled and removed from the methyl ester reaction product prior to distillation.*

*23. The modified asphalt composition of claim 22, wherein the ester bottoms include unsaponifiables in an amount of at least about 10% thereof.*

*24. The modified asphalt composition of claim 22, wherein the ester bottoms include one or more sodium soaps.*

*25. The modified asphalt composition of claim 22, wherein the ester bottoms have a viscosity range of between about 10 cP and about 900 cP at 64° C.*

*26. The modified asphalt composition of claim 22, wherein the asphalt includes from about 20 wt % to about 60 wt % recycled asphalt.*

* * * * *